United States Patent Office 3,290,328
Patented Dec. 6, 1966

3,290,328
2-HYDROXYMETHYL-5-NITROIMIDAZOLES
AND PROCESS
Janos Kollonitsch, Westfield, N.J., assignor to Merck &
Co., Inc., Rahway, N.J., a corporation of New Jersey
No Drawing. Filed Nov. 9, 1965, Ser. No. 507,064
9 Claims. (Cl. 260—309)

This application is a continuation-in-part of my pending application Serial No. 326,379, filed November 27, 1963, now abandoned.

This invention relates generally to the synthesis of substituted imidazoles. More particularly, it relates to the synthesis of 5-nitroimidazoles having a hydroxymethyl radical at the 2-position. Still more specifically, it is concerned with the preparation of 1-substituted-2-hydroxymethyl-5-nitroimidazole compounds from the corresponding 1-substituted-5-nitroimidazoles.

1-substituted-2-hydroxymethyl-5-nitroimidazoles of the formula

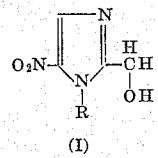

(I)

where R is lower alkyl, hydroxyalkyl or acyloxyalkyl, are useful compounds in that they exhibit a significant degree of anti-histomonal and anti-trichomonal activity. Heretofore, these 2-hydroxymethyl imidazoles were obtainable only by difficult syntheses which afforded the desired products in poor yield, and/or required an unattractive sequence of reactions.

One desirable synthetic approach to such 1-substituted-2-hydroxymethyl-5-nitroimidazoles would be by the direct introduction of the hydroxymethyl radical into a 1-alkyl or 1-hydroxyalkyl-5-nitroimidazole. This approach was considered by Grindley and Pyman who reacted 1-methyl-5-nitroimidazole with aqueous formaldehyde in an effort to produce 1-methyl-2-hydroxymethyl-5-nitroimidazole. J. Chem. Soc. 1927, 3129. These authors were unable to recover any of the desired product, and indeed reported the recovery of very large amounts of unreacted starting material.

It is an object of the present invention to provide a new and convenient method of introducing the hydroxymethyl radical directly into the 2-position of 1-substituted-5-nitroimidazoles. A further object is provision of a feasible and highly practical synthesis of 1-substituted-2-hydroxymethyl-5-nitroimidazoles from the corresponding 1-substituted-5-nitroimidazoles. It is a still further object to provide a process which affords the desired 2-hydroxymethyl imidazoles in high yields. An additional object is a process in which the reaction is carried out in a particular type of solvent medium. A more specific object is provision of a process wherein direct introduction of a hydroxymethyl radical at the 2-position of 1-substituted-5-nitroimidazole is effected in high yield by carrying out the reaction in a particular type of solvent at elevated temperatures and in the substantial absence of water. Other objects of the invention will be evident from the following description.

In accordance with this invention, I have now discovered that imidazoles of Formula I herein may be obtained in substantial yield from the corresponding 1-substituted-5-nitroimidazole by reacting such imidazole with formaldehyde in a diloweralkyl sulfoxide reaction solvent. This process may be represented structurally as

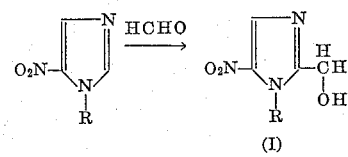

(I)

In the above structures R represents a lower alkyl radical such as methyl, ethyl, propyl, isopropyl or butyl, or a hydroxyalkyl or acyloxyalkyl substituent of the formula —$(CH_2)_nOX$ where $n$ is 1–3, and X is hydrogen or lower alkanoyl such as acetyl, propionyl, butyryl and the like, examples of which are hydroxymethyl, β-hydroxyethyl, β-acetoxyethyl, β-propionoxyethyl, α-hydroxypropyl and α-acetoxypropyl. In the preferred embodiments of the process, R is methyl, β-hydroxyethyl or β-loweralkanoyloxyethyl.

According to my invention, the nitroimidazole and aldehyde are reacted together in a diloweralkylsulfoxide reaction medium. Dimethylsulfoxide is the preferred solvent although others such as diethylsulfoxide or dipropylsulfoxide could be used if desired. The amount of dimethylsulfoxide (or other diloweralkylsulfoxide) employed is not critical, although sufficient is employed to dissolve both the 1-substituted-5-nitroimidazole and the aldehyde reactants. Generally, at least one part (by weight) of diloweralkyl sulfoxide is used for each part (by weight) of 1-substituted-5-nitroimidazole, and larger quantities can be employed without any adverse effect.

Best results are obtained in my process when the reaction medium is maintained substantially free of water, although absolutely anhydrous conditions are not essential. It is desirable that the amount of water in the reaction be no greater than about 5% by weight of the total reaction mass. The process is conducted at elevated temperatures of at least about 75° C. Temperatures in the range of 75–150° C. give good results, and under preferred conditions I prefer to employ temperatures of from about 90–130° C. The reaction is normally carried out in a closed system due to the volatility of the reactants. For optimum yields, the reaction is continued for from 15–30 hours, and preferably for 20–26 hours at temperatures in the range of 90–130° C.

The 1-substituted-5-nitroimidazole and aldehyde may be reacted together in equimolar amounts, although in the preferred embodiments of the process an excess of aldehyde reactant is used. Up to 8 moles of aldehyde per mole of 1-substituted-5-nitroimidazole may be used with good success, and it is generally preferred to employ from 2–5 moles of aldehyde per mole of nitroimidazole.

The process of the invention is particularly useful for making 1 - substituted-2-hydroxymethyl-5-nitroimidazole compounds from a 1-substituted-5-nitroimidazole and formaldehyde. The formaldehyde may be added as such to the dimethylsulfoxide (or other diloweralkylsulfoxide) medium, or paraformaldehyde may be used as a source of formaldehyde, with the aldehyde being generated directly in the reaction medium. Aqueous formaldehyde solutions, e.g. formalin, are not suitable since they contain large amounts of water and the process does not proceed satisfactorily, even in dimethylsulfoxide, when substantial amounts of water are present.

Representative examples of compounds which are readily prepared by the method of this invention are 1-methyl-2-hydroxymethyl-5-nitroimidazole, 1-ethyl-2-hydroxymethyl-5-nitroimidazole, 1-(β-hydroxyethyl)-2-hydroxymethyl-5-nitroimidazole and 1-(β-acetoxyethyl)-2-hydroxymethyl-5-nitroimidazole.

The imidazoles produced by this process have activity against the parasitic disease histomoniasis, an affliction of turkeys also known as turkey blackhead disease. When used for this purpose, they are administered to the fowl via the drinking water or by incorporations in the animal feed. They are further useful against another parasitic disease trichomoniasis. In addition, the compounds of Formula I above are key intermediates in the synthesis of 1-substituted-5-nitroimidazole-2-carboxamides, which latter substances have a high degree of anti-histomonal and anti-trichomonal activity.

The starting materials for the process of my invention are in general described in the literature. Those which are not specifically described in the art are readily obtained by known methods from well-known chemical compounds.

The following examples are given for the purpose of illustration and not by way of limitation.

EXAMPLE 1

*1-methyl-2-hydroxymethyl-5-nitroimidazole*

27.9 g. of 1-methyl-5-nitroimidazole and 30.1 g. of paraformaldehyde are added to 154 ml. of dimethylsulfoxide and the resulting solution is sealed into a glass-lined tube. The solution is heated at 110° C. for 24 hours, with shaking. The mass is then removed from the reaction vessel and the dimethylsulfoxide removed by distillation at 53–56° C./2 mm. The residue is extracted with 3 x 150 ml. of hot benzene. The benzene extracts are combined and cooled to room temperature. 1-methyl-2-hydroxymethyl-5-nitroimidazole crystallizes, and is recovered by filtration. 23 g. of product are obtained, M.P. 112–114.5° C.

When this procedure is followed using 31 g. of 1-ethyl-5-nitroimidazole as starting material, 1-ethyl-2-hydroxymethyl-5-nitroimidazole is obtained.

EXAMPLE 2

*1-(β-acetoxyethyl)-2-hydroxymethyl-5-nitroimidazole*

1.4 g. of 1-(β-acetoxyethyl)-5-nitroimidazole, 1.05 g. of paraformaldehyde and 5 ml. of dimethylsulfoxide are placed in a glass tube. The tube is sealed and heated at 110° C. for 24 hours. The mixture is then removed and concentrated to dryness in vacuo. The residue is extracted with 5 ml. of hot hexane. The hexane-insoluble material is dissolved in about 10 ml. of benzene. The benzene solution is concentrated to about a 5 ml. volume, and hexane added slowly to induce crystallization of 1 - (β - acetoxyethyl) - 2 - hydroxymethyl - 5 - nitroimidazole. The product thus obtained is recovered by filtration and air dried, M.P. 88–90° C. Yield: 81% of theoretical.

1 - (β - hydroxyethyl) - 2 - hydroxymethyl - 5 - nitroimidazole is obtained by repeating the above experiment and using as starting material 1-(β-hydroxyethyl)-5-nitroimidazole.

EXAMPLE 3

5.0 g. (0.0318 M) of 1-methyl-2-hydroxymethyl-5-nitroimidazole is suspended in 75 ml. of cold acetone. While maintaining the temperature at 0° to —5° C., 6.65 gm. (0.048 M) of potassium permanganate is added in small portions with vigorous stirring. After the last addition of permanganate the reaction is allowed to warm slowly to room temperature.

The reaction mixture is filtered and the solid material is extracted with water. The aqueous extracts are evaporated to dryness, in vacuo, to give a residue of crystalline potassium 1-methyl-5-nitroimidazole-2-carboxylate mixed with potassium hydroxide.

1.0 g. of crude potassium 1-methyl-5-nitroimidazole-2-carboxylate is added with rapid stirring to 40 ml. of oxalyl chloride, and the reaction mixture is refluxed for one hour.

The reaction mixture is then evaporated to dryness in vacuo. A small amount of benzene is added to the residue, and the benzene removed from the resulting suspension by evaporation in vacuo. The resulting 1-methyl-5-nitroimidazole-2-carbonyl chloride is dried and stored under vacuum. It is not free of inorganic salts, but may be used directly in the next step without further purification.

0.86 g. of crude 1-methyl-5-nitroimidazole-2-carbonyl chloride is suspended in 5 ml. of benzene. The resulting suspension is filtered to remove inorganic salts. An excess of anhydrous ammonia is bubbled into the benzene solution, with rapid stirring. The benzene is then removed in vacuo, and the residue of 1-methyl-5-nitroimidazole-2-carboxamide is dissolved in a minimum amount of ethyl acetate. The ethyl acetate solution is filtered and the filtrate concentrated to dryness. The residual 1-methyl-5-nitroimidazole-2-carboxamide is recrystallized from acetone to give substantially pure material, M.P. 222–224° C. (subl.).

The other 1-substituted-2-hydroxyethyl-5-nitroimidazoles obtained by the process of this invention are converted in similar fashion to the corresponding 2-carboxamides, the only necessary precaution being to protect a 1-hydroxyalkyl substituent by acylation. As previously stated, these amides are highly active against turkey blackhead disease and the trichomonal infection *T. vaginalis* vaginitis.

The 1-alkyl-2-hydroxymethyl-5-nitroimidazoles described herein, the method of Example 3 for converting them to the amides, and the 1-substituted-5-nitroimidazole-2-carboxamides thus obtained are not my invention, but are the invention of my colleague, Dale R. Hoff, and are the subject of copending application Serial No. 300,629 filed Aug. 7, 1963.

Any departure from the above description which conforms to the present invention is intended to be included within the scope of the claims.

What is claimed is:

1. The process for preparing a 5-nitroimidazole of the formula

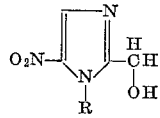

where R is selected from the class consisting of lower alkyl and —(CH$_2$)$_n$OX, wherein $n$ has a value of 1–3 and X represents a member of the class consisting of hydrogen and lower alkanoyl, that comprises treating a 5-nitroimidazole of the formula

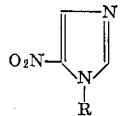

with formaldehyde where R is as defined above, said reaction being carried out at an elevated temperature and in a substantially anhydrous diloweralkylsulfoxide reaction medium.

2. The process of claim 1 wherein the reaction is carried out at a temperature of at least 90° C.

3. The process of claim 1 wherein paraformaldehyde is employed as the source of the formaldehyde reactant.

4. The process of claim 1 wherein R represents β-loweralkanoyloxyethyl, and the diloweralkylsulfoxide is dimethylsulfoxide.

5. The process of claim 1 wherein R represents methyl, and the diloweralkylsulfoxide is dimethylsulfoxide.

6. The process of claim 1 wherein R represents methyl, the elevated temperature is one of at least 90° C., the diloweralkylsulfoxide is dimethylsulfoxide, and paraformaldehyde is employed as the source of formaldehyde reactant.

7. A compound having the formula

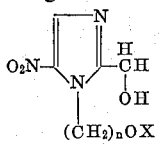

where $n$ is 1–3 and X is selected from the class consisting of hydrogen and loweralkanoyl.

8. The compound of claim 7 where $n$ is 2 and X is acetyl.

9. The compound of claim 7 where $n$ is 2 and X is hydrogen.

No references cited.

WALTER A. MODANCE, *Primary Examiner.*

NATALIE TROUSOF, *Assistant Examiner.*